United States Patent [19]

Davis

[11] 4,323,808
[45] Apr. 6, 1982

[54] LASER EXCITED THERMIONIC ELECTRIC CONVERTER

[76] Inventor: Edwin D. Davis, Daytona Beach, Fla.

[21] Appl. No.: 169,799

[22] Filed: Jul. 17, 1980

Related U.S. Application Data

[63] Continuation-in-part of Ser. No. 33,025, Apr. 24, 1979.

[51] Int. Cl.³ .............................................. H01J 45/00
[52] U.S. Cl. ...................................... 310/306; 310/11
[58] Field of Search ............................ 310/306, 10, 11

[56] References Cited

U.S. PATENT DOCUMENTS

| | | | |
|---|---|---|---|
| 3,218,196 | 11/1965 | Jensen | 310/306 X |
| 3,467,840 | 9/1969 | Weiner | 310/306 |
| 3,519,854 | 7/1970 | Davis | 310/306 |
| 3,748,505 | 7/1973 | Lavarini | 310/11 |
| 3,899,696 | 8/1975 | Shimada | 310/306 |
| 3,975,651 | 8/1976 | Griffiths | 310/11 |
| 4,134,034 | 1/1979 | Davelai et al. | 310/11 |
| 4,275,318 | 6/1981 | Duncan | 310/11 |

Primary Examiner—Donovan F. Duggan
Attorney, Agent, or Firm—Kerkam, Stowell, Kondracki & Clarke

[57] ABSTRACT

A laser excited thermionic electric converter is disclosed wherein an externally located heat source causes electrons to be boiled off an electron emissive surface interiorly positioned on one end wall of an evacuated cylindrical chamber. A grid having a small negative potential traps the electron flow and the mass of electrons is then exposed to a laser pulse discharge and at the same time the potential on the grid is removed to permit a bolus of electrons to flow therethrough. The electron bolus is electrically focused and accelerated through the interior of an air core induction coil located within a transverse magnetic field, and subsequently is collected on the other end wall of the chamber functioning as a collecting plate. The EMF generated in the induction coil by action of the transiting electron bolus interacting with the transverse magnetic field is applied to an external circuit to perform work.

7 Claims, 7 Drawing Figures

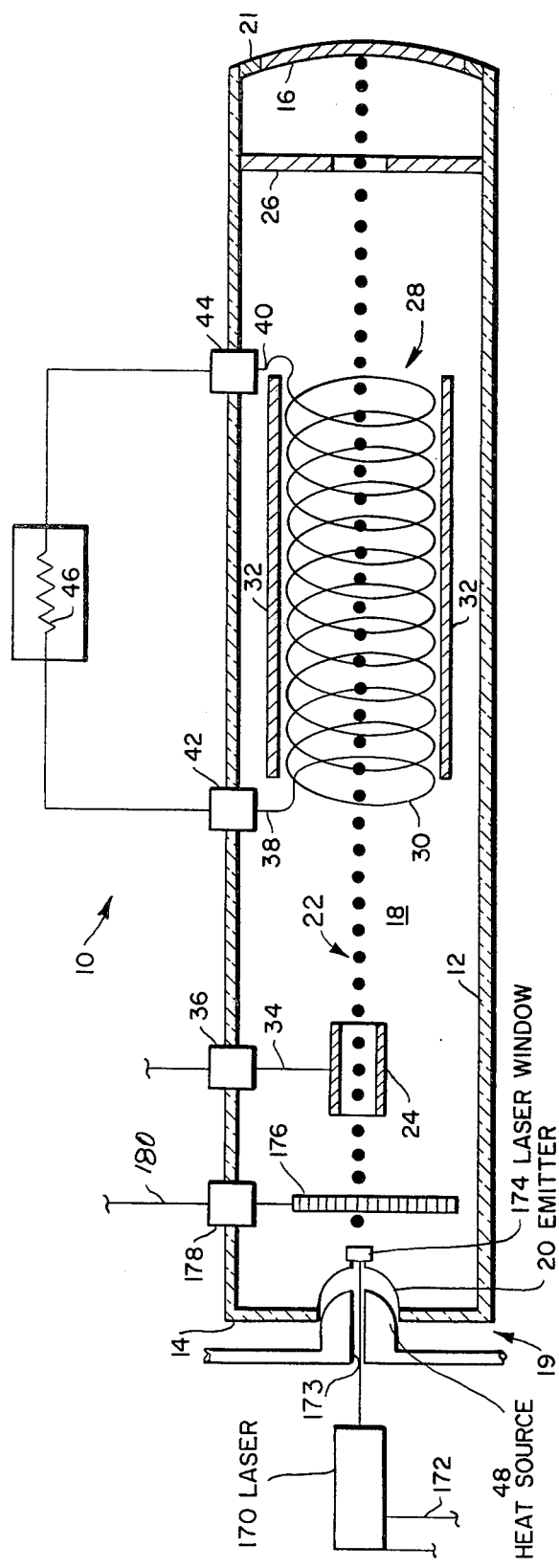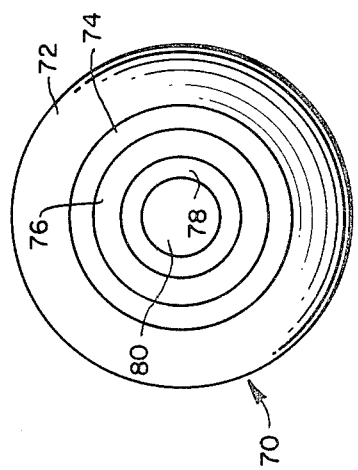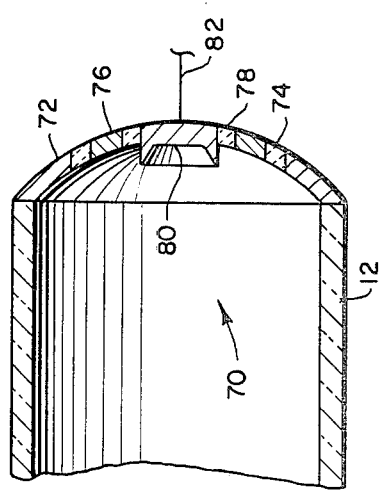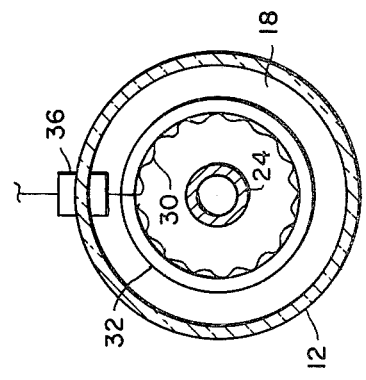

LASER EXCITED THERMIONIC ELECTRIC CONVERTER

DESCRIPTION

Cross-Reference to Related Application

This application is a continuation-in-part of my copending application Ser. No. 033,025 filed Apr. 24, 1979.

TECHNICAL FIELD

The present invention relates generally to the field of converting heat energy directly to electrical energy, and more particularly to apparatus having a thermionic source of electrons, which electrons subsequently produce currents in an induction coil for energizing externally connected loads.

BACKGROUND OF PRIOR ART

Heretofore, there have been known thermionic converters such as shown in my U.S. Pat. Nos. 3,519,854 and 3,328,611 which disclose apparatus and methods for the direct conversion of thermal energy to electrical energy. In U.S. Pat. No. 3,519,854 there is described a converter using a Hall effect technique as the output current collection means. The teaching in U.S. Pat. No. 3,519,854 is of interest in that it uses as its source of electrons a stream boiled off of an emissive cathode surface and accelerated towards an anode positioned beyond the Hall effect transducer. In U.S. Pat. No. 3,328,611, a spherically configured thermionic converter is disclosed wherein a spherical, emissive cathode is supplied with heat (from several alternate sources including a self-contained fuel combustion section) thereby emitting electrons to a concentrically positioned, spherical anode under the influence of a control member having a high positive potential thereon.

While the above two illustrative examples of prior art thermionic converters teach apparatus for accomplishing the desired direct conversions, and while a good deal of additional inventive effort has been directed to the practical and theoretical problems associated with such conversion means, it is clear that there continues to be a need for improved devices and methods for direct thermal/electric converters.

The Thermionic Electric Converter of my application Ser. No. 033,025 implements a technique for the direct conversion of heat energy to electrical energy by using a stream of electrons thermally released from an electron emissive cathode, and accelerated by a static electric field to transit through the center of a pick-up coil immersed in a strong magnetic field, thereby producing an induced EMF. The heat energy may be derived from any source whatever, and the induced EMF is directly used to power electrical loads.

BRIEF SUMMARY OF INVENTION

The Thermionic Electric Converter of the present invention implements a technique for the direct conversion of heat and light energy to electrical energy by using a stream of electrons thermally released from an electron emissive cathode. The electrons are trapped at a grid having a small negative potential and while trapped the mass of electrons is then exposed to a laser pulse discharge and at the same time the potential on the grid is removed to permit a bolus of electrons to flow therethrough.

The electron bolus is electrically focused and accelerated through the interior of an air core induction coil located within a transverse magnetic field, and subsequently is collected on the other end wall of the chamber functioning as a collecting plate. The EMF generated in the induction coil by action of the transiting electron bolus interacting with the transverse magnetic field is applied to an external circuit to perform work.

It is therefore a primary object of this invention to provide improved apparatus for directly converting heat and light energy to electrical energy.

A further object of the present invention is to provide improved apparatus for changing heat and light energy to an electrical current without passing through the conventional mechanical steps of operating a generator to produce an electrical current.

A further object of the present invention is to provide apparatus for converting heat and light energy into electrical energy using the thermally released light compacted electrons to execute an interactive path within a stationary magnetic field thereby inducing an EMF within a coil useable to energize electrical loads.

BRIEF DESCRIPTION OF DRAWINGS

These and other features of the present thermionic electric converter and the attendant advantages will be readily apparent to those having ordinary skill in the art, and the invention will be more easily understood from the following detailed description of the preferred embodiments of the present invention taken in conjunction with the accompanying drawings wherein like reference characters represent like parts throughout the several views.

FIG. 1B is schematic side view of the laser excited thermionic electric converter according to the present invention after laser excitation;

FIG. 2 is schematic end view of the converter;

FIGS. 4A and 4B show a further alternate embodiment of a collecting plate mechanism.

DETAILED DESCRIPTION OF DRAWINGS

Figure 1A:
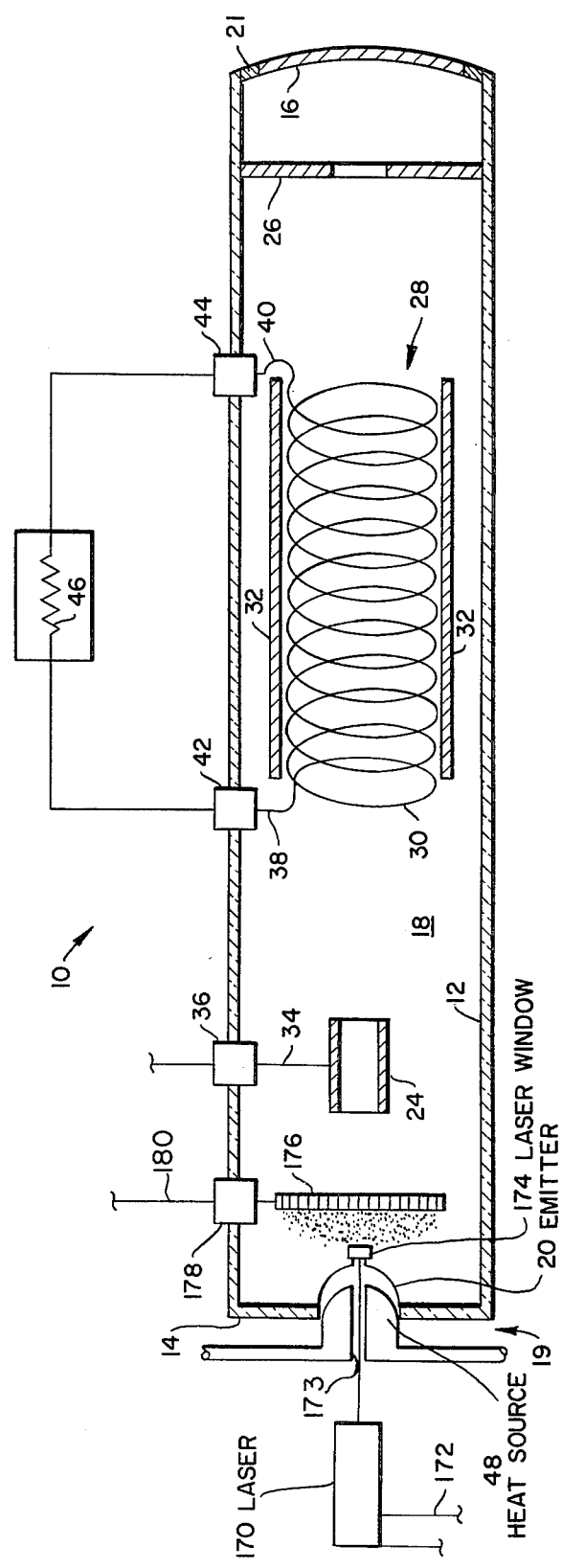
FIG. 1A is schematic side view of the laser excited thermionic electric converter according to the present invention prior to laser excitation.

Referring now to FIGS. 1A and 1B, there is shown a schematic side view of a laser excited thermionic electric converter according to the present invention. The converter is shown generally at 10 having an elongated, cylindrically shaped outer housing 12 fitted with a pair of end walls 14 and 16, thereby forming a closed chamber 18. The housing 12 is made of any one of a number of known strong, electrically non-conductive materials such as glass, high temperature plastics or ceramics, while the end walls 14 and 16 are metallic plates to which electrical connections may be made. The three elements are mechanically bonded together and hermetically sealed such that the chamber 18 may support a vacuum, and a moderately high electrical potential may be applied and maintained across the end walls 14 and 16. The first end wall 14 contains a shaped cathode and laser entry region 19. The cathode, in region 19, designated 20, has an electron emissive coating (not shown) disposed on its interior surface, while the second end wall 16 is formed as a circular, slightly convex surface which is first mounted in an insulating ring 21 to form an assembly, all of which is then mated to the housing 12. In use, the end walls 14 and 16 function respectively as the cathode terminal and the collecting plate of the converter 10. Between these two walls eletron bolus 22, FIG. 1B, will flow substantially along the axis of symmetry of the cylindrical chamber 18, originating at the cathode region 20 and terminating at the collecting plate 16.

An annular focusing element 24 is concentrically positioned within the chamber 18 at a location down stream from the cathode 20. A baffle element 26 is concentrically positioned within the chamber 18 at a location adjacent to the collecting plate 16.

Disposed between these two elements 24 and 26 is an induction assembly 28 comprised of a helical induction coil 30 and an elongated annular magnet 32. The coil 30 and the magnet 32 are concentrically disposed within, and occupy the central region of, the chamber 18. Referring briefly to the schematic end view of FIG. 2, the relative radial positioning of the various elements and assemblies may be seen. For clarity of presentation, the mechanical retaining means for these interiorly located elements have not been included in either figure. Focusing element 24 is electrically connected by means of a lead 34 and a hermetically sealed feed through 36 to an external source of static potential (not shown). The induction coil 30 is similarly connected via a pair of leads 38 and 40 and a pair of feed throughs 42 and 44 to an external load element shown simply as a resistor 46.

Between the emitter 20 and the focusing element 24 is positioned a grid 176 which is connected via lead 180 and feed through 178 to a source of negative potential on the order of 5 to 10 volts. This grid 176, when so energized, is used to instantaneously stop the flow of electrons and when the negative potential is removed from the grid the electrons will flow again to the focusing device 24.

External to the wall 14 is mounted a heat source 48 employed to boil-off electrons from the electron emissive coating on the cathode 20. Also, mounted external of the wall 14 is a laser 170 connected to a source of power (not shown) via conductors 172. The laser output passes through an opening 173 in the heater 48 and through a laser window 174 in the cathode/emitter 20 to impinge upon electrons in the zone of the grid 176. When the grid 176 is energized the electrons from emitter 20 will stop and remain in that general area in a normal state in which the volume between the electrons is much greater than the volume of the electrons themselves. This difference would be on the order of one millionfild. When this mass of electrons is exposed to a laser pulse discharge, the polarity of some of the electrons will be changed and their spins will be reversed. This, then permits the electron mass to contract into an infinitesimally small volume but with relatively great mass and with an electrical charge. The mass, however, obeys the general electron law in that it would travel at the speed of light in a vacuum. At the time the electron mass is contracted into its smallest volume the current to the grid would be stopped to permit the electron bolus to pass through the electromagnetic tunnel. The great mass of the bolus with its high velocity interacts upon the electromagnetic lines of force within the converter and thus produce very large current flows in coil 30, at each cycle of the laser 170 and grid 176.

The potentials applied to the various elements are not explicitly shown nor discussed in detail as they constitute well known and conventional means for implementing related electron stream devices. Briefly, considering the cathode region 20 as a voltage reference level, a high positive voltage is applied to the collecting plate 16 and the external circuit containing this voltage source is completed by connection of its negative side to the cathode 20. This applied high positive voltage causes the electron bolus 22 which originated at the cathode and grid region to be accelerated towards the collecting plate 16 with a magnitude directly dependent upon the magnitude of the high voltage applied. The electron bolus impinge upon the collecting plate 16 at a velocity sufficient to cause a certain amount of ricochet. The baffle element 26 is configured and positioned to prevent these ricochet electron bolus from reaching the main section of the converter, and electrical connections (not shown) are applied thereto as required. A positive voltage of low to moderate level is applied to the focusing element 24 for focusing the bolus stream 22 into a narrow beam.

In operation, the heat source 48, which could be derived from diverse sources such as combustion of fossil fuels, solar devices, atomic, atomic waste or heat exchangers from existing atomic operations, is used to heat the electron emissive coating on the cathode 20 thereby boiling off quantities of electrons. The released electrons gather on the cathode 20 side of the grid 176 to which has been applied a low negative potential.

When the laser 170 intermittent or continuous discharge laser, either gas or solid, is triggered the mass of electrons is exposed to a laser pulse discharge and the polarity of some of the electrons is changed and their spins reversed, thus form the electron bolus which are released sequentially by removing the negative bias on the grid 176.

The released electron boluses are focused into a narrow beam by focusing element 24 and are accelerated towards the collecting plate 16. While transiting the induction assembly 28, the boluses come under the influence of the magnetic field produced by the magnet 32 and execute an interactive motion which causes an EMF to be induced in the turns of the induction coil 30. Actually, this induced EMF is the sum of a large number of individual electron boluses executing small circular current loops thereby developing a correspondingly large number of minute EMFs in each winding of the coil 30. Taken as a whole, the output voltage of the converter is proportional to the velocity/mass of the electron boluses in transit. The mechanism for the induced EMF may be explained in terms of the Lorentz force acting on an electron bolus having an initial linear velocity as it enters substantially uniform magnetic field orthogonally disposed to the electron velocity. In a properly configured device, a spiral path (not shown) results, which produces the desired net rate of change of flux as required by Faraday's law to produce an induced EMF. This spiral path results from a combination of the linear translational path (longitudinal) due to the acceleration action of collecting plate 16 and a circular path (transverse) due to the interaction of the initial electron bolus velocity and the transverse magnetic field of magnet 32. Depending on the relative magnitude of the high voltage applied to the collecting plate 16 and the strength and orientation of the magnetic field produced by the magnet 32, other mechanisms for producing a voltage directly in the induction coil 30 may be possible. The mechanism outlined above is suggested as an illustrative one only, and is not considered as the only operating mode available. All mechanisms, however, would result from various combinations of the applicable Lorentz and Faraday considerations.

Figure 3A:
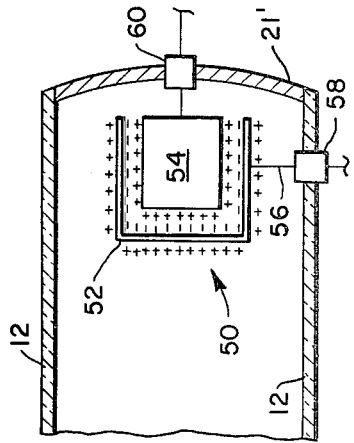
FIGS. 3A and 3B show alternate embodiments of collecting assemblies comprised of compound electrophorus elements.
Figure 3B:
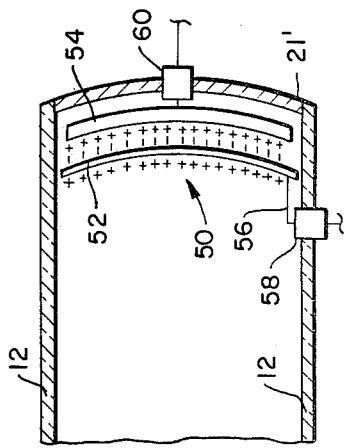

The collecting plate 16, which has been described as a single conductive element, may be configured as shown in FIGS. 3A and 3B. Referring to FIG. 3A, element 16 has been replaced with a compound collector 50, comprised of electrophorus collector elements 52 and 54. Collector element 52 is made of electrically conductive material, while collector element 54 is a non-conductor. Conductive element 52 is electrically connected to the external system circuitry via a lead 56, and a feed through 58 positioned in the outer casing 12. Non-conductive element 54 is similarly connected via a feed through 60 positioned in the extended insulated end wall 21'. In operation, element 54 is charged with a static charge of positive sign, which will induce a negative change on the adjacent side of element 52, and will cause a positive charge to be induced on the opposite side of element 52. The various charges are illustrated as linear distributions of appropriately polarity charges along their respective surfaces. The positive charge on element 52 will then act to attract the electrons being emitted from the cathode 20. Thus, the charge remains on element 52 as long as the charge remains on element 54, and the electron boluses never contact element 54. The electron boluses do not neutralize the positive charge on element 52 because they are constantly drained off through a grounding means.

FIG. 3B shows an alternate embodiment of the compound collector 50, which has a modified geometry but essentially functions as the embodiment of FIG. 3A. Note that the elements 52 and 54 are shaped so as to be nested together. As before, element 54 is charged with a positive sign, which induces a charge on the container-like element 52 which is negative on the inner surface and which induces a positive on the outer surface of the element 52. Once again, the attracted electron boluses are immediately drained off via the lead 56 and are grounded.

FIGS. 4A and 4B show a further alternate embodiment which may be employed in lieu of the collecting plate 16. Referring to partial side view 4A and end view 4B, element 16 has been replaced with collector plate mechanism 70 comprised of a number of concentric sections, all of which are shaped to produce a truncated hemispherical overall form. Collector mechanism is made of a general housing 72 which is bonded to the cylindrical outer housing 12. General housing 12 serves as the outermost ring, to the inner edge of which is bonded an insulation ring 74. A heavily statically charged ring 76 is next bonded to the insulation ring 74. An intercollecting element consisting of an insulation ring 78 is next bonded into the collector plate mechanism 70, and finally a circular collecting element 80 provides the central area. The collecting element 80 is electrically connected to the external system circuitry via a lead 82. In operation, a heavy static charge is applied to the charged ring 76 (via a lead not shown), which ring would then serve as the attracting force for the electron boluses stream. Thereafter system operation is substantially as detailed above, except for the need, under certain operating conditions, for additional electron boluses focusing in the region between the induction coil 30 and the collecting plate. This additional electron boluses focusing is readily accomplished by the insertion of an additional focusing element, similar to that of element 24 of FIGS. 1A and 1B, which would control electron boluses scatter.

While in the basic embodiment described it is apparent that an AC output voltage is produced, a variety of adjunct conversion means may be used to provide the output electrical energy in almost any desired form. An internal mechanism for providing the output energy in alternate forms is available by dividing the induction coil 30 into a number of individual coils. The output from each of the individual coils may then be used to energize separate external loads, or may be combined in various ways to optimize the available output voltages, currents, and power, as well as to minimize output power ripple. Clearly, as the induction coil 30 serves to produce incrementally induced voltages throughout substantially all of its length, any subsection thereof may also be considered as a discrete source of electrical energy and may be used accordingly.

It will also be recognized by those skilled in the art that the frequency of discharge of the laser determines the cycling of the current. An example: If one wanted 60 cycle current, two sets of apparati with reverse polarity would discharge into the same electrical circuit at a frequency of 30 discharges each which when compounded into a sign curve configuration, would produce 60 cycle alternating current.

Although the invention has been described in terms of selected preferred and illustrative embodiments, the invention should not be deemed limited thereto, since other embodiments and modifications will readily occur to one skilled in the art. For example, the magnet 32 described as being a permanent magnet may readily be replaced by an electromagnet. Further, a portion of the electrical energy produced by the converter may be used in part to supply the electrical needs of the converter itself. It is therefore, to be understood that the appended claims are intended to cover all such modifications as fall within the true spirit and scope of the invention.

I claim:

1. Apparatus for converting heat and light energy directly into electrical energy comprising:
    (a) a cathode element having an electron emissive surface for emitting electrons in response to the application of heat energy to said surface;
    (b) a grid for selectively trapping said electrons;
    (c) a pulse laser positioned to direct a laser beam toward the trapped electrons to convert the electrons to electron boluses;
    (d) a collecting element maintained at a positive electrical potential with respect to said cathode element for attracting, accelerating and collecting said electron boluses;
    (e) an induction assembly comprised of a helical coil having a longitudinal axis and means for producing a stationary transversely oriented magnetic field in the interior region of said coil;
    (f) an evacuated elongated container for fixedly housing said cathode element at a first end, and said collecting element at a second end, and said induction assembly at an intermediate location therein;
    (g) whereby said electron boluses in accelerated transit towards said collecting element are caused to pass through said coil interior region therein individually exhibiting an oscillatory magnetic field action thus giving rise to an induced EMF in said coil.

2. The apparatus of claim 1 wherein said helical coil is comprised of a plurality of separate coil sections, which coil sections are electrically interconnected to optimize the output power of said converter.

3. The apparatus of claim 1 wherein said helical coil is comprised of a plurality of separate coil sections, which coil sections are electrically interconnected to minimize the output ripple of said EMF.

4. The apparatus of claim 1 wherein said means for producing said magnetic field comprises a permanent magnet.

5. The apparatus of claim 1 wherein said means for producing said magnetic field comprises an electromagnet.

6. The apparatus of claim 5 wherein said electromagnet is energized at least in part by said induced EMF.

7. The apparatus of claim 1 further comprising means for focusing said emitted and accelerated electrons into a narrow beam prior to their entering said induction assembly.

* * * * *